UNITED STATES PATENT OFFICE 2,499,588

PROCESS OF TREATING DILUTE AQUEOUS RUBBER DISPERSIONS

Ian Kemp, London, England, assignor to Revertex Limited, London, England

No Drawing. Application July 17, 1946, Serial No. 684,264. In Great Britain December 24, 1941

Section 1, Public Law 690, August 8, 1946
Patent expires December 24, 1961

5 Claims. (Cl. 260—815)

This invention relates to a process of recovering rubber from skim such as is obtained in the centrifuging and creaming treatments of rubber latices.

The term "rubber" used herein is intended to include not only natural rubber (caoutchouc) but also allied vegetable resins, such as gutta percha and balata.

Skim as obtained in the centrifuging of rubber latex generally contains between about 7 and about 12% total solids. In skim containing about 7 to 8% T. S. the proportion of solid non-rubber constituents to rubber is approximately equal. As compared with a rubber latex with a 35% T. S. content, which contains about 32% of rubber and about 3% of solid non-rubber constituents, the ratio of solid non-rubber constituents to rubber in skim is inordinately high and it has therefore been considered uneconomic to treat skim for the recovery of the small percentage of rubber said skim contains. Consequently at the present time, the skim of centrifuged rubber latex is usually allowed to run to waste. It is true that attempts have been made to coagulate or flocculate the rubber content of skim from centrifuged latices to yield a product resembling crepe rubber. However the coagulated rubber thus obtained contains such a high proportion of entrained non-rubber constituents that the product is not of standard quality.

For the purpose of more clearly defining the ambit of the invention, the term "skim" as hereinafter used is intended to denote a dilute aqueous dispersion having a T. S. content not exceeding 15% in which the ratio of solid non-rubber constituents to rubber lies between approximately 1:1 and 1:4.

The present invention contemplates a treatment of skim as defined in the preceding paragraph which boardly comprises flocculating the rubber content of said skim with a suitable flocculating agent, thereupon filtering the whole, leaving the flocculated rubber as residue, washing the flocculated rubber in order to remove non-rubber constituents and impurities therefrom, and converting the flocculated rubber into an aqueous dispersion by means of water containing a dispersing agent, such as caustic alkali or ammonia in solution. The term "flocculation" is used in the present specification and claims in the sense in which it is normally accepted in the rubber industry, namely, to describe a phenomenon where the rubber particles in a dispersion are aggregated in such a manner that groups of discrete rubber particles cohere to form aggregations in which said discrete rubber particles are separated by absorbed layers of protective colloids, such aggregates being redispersible as discrete particles in a liquid medium containing a deflocculating agent.

The rubber dispersion thus produced has a very high rubber to T. S. ratio. Thus, in view of its high degree of purity and convenient concentration, such rubber dispersion constitutes an excellent starting material for the product known under the registered trade-mark "Positex." Moreover, it can be concentrated by any suitable known method, such as evaporation, centrifuging or creaming. Preferably however it is admixed to another rubber dispersion to be concentrated, thereby reducing the ratio of non-rubber constituents to rubber in said rubber dispersion to be concentrated.

The process of the present invention is of particular advantage when applied to the treatment of skim derived from pre-vulcanised rubber latex dispersions such as those known under the registered trade-mark "Revultex." Such skims are hitherto regarded as entirely useless inasmuch as they were discoloured and containing vulcanising ingredients such as ammonium polysulphide, accelerators and dispersing agents for the vulcanising ingredients. By virute of the treatment with flocculating agents in accordance with the present invention however, the foregoing ingredients are decomposed thereby improving the colour of the skim.

Suitable flocculating agents for the purposes of the present invention are for example mineral acids such as sulphuric, nitric and hydrochloric acids, and certain organic acids such as acetic acid.

According to one method of carrying out the invention as applied to the treatment of rubber latex skim derived from a centrifuging process, the skim is first de-ammoniated and its ammonia content recovered. This treatment leads to an economy in the amount of flocculating agent to be employed whilst ensuring the recovery of a valuable product viz. ammonia. Thereupon a suitable amount of a flocculating agent, such as for example dilute sulphuric acid substantially free from iron, is added to the de-ammoniated skim, whereupon the rubber flocculates. The whole is then filtered through a filter cloth leaving the flocculated rubber on the cloth. The flocculated rubber is washed on the filter cloth with water in order to remove non-rubber constituents and any impurities such as sulphur compounds, metal salts and the like.

Thereupon the flocculated rubber is removed from the filter cloth by washing same off with a dilute aqueous solution of caustic potash or with aqueous ammonia. This operation produces a rubber dispersion of about 20 to 21% T. S. and having a ratio of D. R. C. to T. S. C. of up to 98%. This dispersion is mixed with fresh latex to be concentrated, for example by evaporation or centrifuging.

If the washed flocculated rubber be redispersed by adding a regenerated rubber dispersion produced in the manner set forth in the preceding paragraph, the later will become enriched and the T. S. C. thereof will exceed 20 to 21%. Likewise, the said enriched dispersion may be progressively enriched by continually adding it to subsequent batches of washed flocculated rubber, so that finally a pure rubber latex of high concentration may be prepared from dilute skim.

This invention is illustrated by the following examples:

Example I 395 lbs. of a batch of centrifugal skim obtained in the manufacture of a pre-vulcanised rubber dispersion known under the registered trade-mark "Revultex" were examined and were found to have a T. S. content of 6.3%, a D. R. C. of 2.74% and an alkalinity of 405 milli-equivalents of NH$_3$. Said skim was discoloured by inclusions of ammonium polysulphide, vulcanisation accelerators, and dispersion agent.

The skim was first de-ammoniated by pump circulation through a plate heat exchanger to a spray-head which discharged a spray of skim down a long tower which was exhausted by a vacuum-pump. The vapours obtained were passed through an ammonia recovery plant of the kind described in British Patent Specification No. 461,216.

As a result of this operation the alkalinity of the skim was reduced to 50 milli-equivalents of NH$_3$.

The de-ammoniated skim was transferred to a drum lined with acid resisting paint and a paste of 0.3 to 0.4 lb. of zinc oxide in water was added. Said zinc oxide reacts with the ammonium polysulphide present in the skim to form white zinc sulphide leaving insufficient sulphur compounds to form coloured sulphides with any metal impurities which may be entrained by the flocculating agent, which in the present instance was sulphuric acid.

20 lbs. of 10% commercial sulphuric acid were next stirred into the mixture whereupon flocculation of the rubber constituents of the skim took place.

The flocculated latex was then passed through a simple cylindrical cloth filter at a filtration rate of 100 to 200 gallons per hour. Washing with water continued until the filtrate was free from sulphide and sulphate.

This flocculate was redispersed by adding 10 N ammonium hydroxide solution yielding 49 lbs. of latex of 21.8% T. S. and 21.0% D. R. C. and having an alkalinity of 300 milli-equivalents of NH$_3$.

Example II 200 lbs. of a skim having 7.3% T. S. and 3.24% D. R. C. and an alkalinity of 430 milli-equivalents NH$_3$ was treated in the manner described in the preceding example. The washed flocculated rubber was thereupon redispersed in 10 N KOH to yield 40.5 lbs. of a dispersion having 15.9% T. S. and 15.1% D. R. C.

The dispersion thus obtained contains 96% of the rubber present in the original skim and is of a high degree of purity so that it can be readily incorporated with other rubber dispersions in normal manufacture of rubber latex concentrates known under the registered trade-marks "Revertex" and "Revultex."

I claim:

1. A process of treating rubber latex skim containing ammonia, which comprises de-ammoniating said skim, flocculating the rubber content of said de-ammoniated skim with a flocculating agent to bring the rubber particles into the form of reversible aggregations, thereupon filtering the thus treated skim to remove the bulk of the serum constituents therefrom, leaving the flocculated rubber as residue, washing said flocculated rubber in order to remove non-rubber constituents and impurities therefrom and thereafter converting the washed flocculated rubber into an aqueous dispersion by means of water containing an alkaline dispersing agent.

2. A process of treating rubber latex skim containing ammonia, which comprises de-ammoniating said skim, flocculating the rubber content of said de-ammoniated skim with a mineral acid flocculating agent, thereupon filtering the whole, leaving the flocculated rubber as residue, washing said flocculated rubber in order to remove non-rubber constituents and impurities therefrom and thereafter converting the washed flocculated rubber into an aqueous dispersion by means of water containing an alkaline dispersing agent.

3. A process of treating rubber latex skim containing ammonia, which comprises de-ammoniating said skim, flocculating the rubber content of said de-ammoniated skim with an organic acid flocculating agent, thereupon filtering the whole, leaving the flocculated rubber as residue, washing said flocculated rubber in order to remove non-rubber constituents and impurities therefrom and thereafter converting the washed flocculated rubber into an aqueous dispersion by means of water containing an alkaline dispersing agent.

4. A process of treating rubber latex skim containing ammonia, which comprises de-ammoniating said skim, flocculating the rubber content of said de-ammoniated skim with a flocculating agent, thereupon filtering the whole, leaving the flocculated rubber as residue, washing said flocculated rubber in order to remove non-rubber constituents and impurities therefrom and thereafter converting the washed flocculated rubber into an aqueous dispersion by means of water containing an alkaline dispersing agent and finally concentrating the dispersion of flocculated rubber.

5. A process of treating rubber latex skim containing ammonia, which comprises de-ammoniating said skim, flocculating the rubber content of said de-ammoniated skim with a flocculating agent, thereupon filtering the whole, leaving the flocculated rubber as residue, washing said flocculated rubber in order to remove non-rubber constituents and impurities therefrom and thereafter converting the washed flocculated rubber into an aqueous dispersion by means of water containing an alkaline dispersing agent, admixing the resultant dispersion of flocculated rubber with another rubber dispersion and concentrating said mixture of dispersions.

IAN KEMP.

(References on following page)

REFERENCES CITED

The following references are of record in the file of this patent:

UNITED STATES PATENTS

| Number | Name | Date |
|---|---|---|
| 1,831,895 | Van Arsdel et al. | Nov. 17, 1931 |
| 1,980,774 | Twiss et al. | Nov. 13, 1934 |
| 2,044,626 | Nyrop | June 16, 1936 |
| 2,119,620 | Benzing et al. | Jan. 7, 1938 |
| 2,229,582 | Merrill | Jan. 21, 1941 |

FOREIGN PATENTS

| Number | Country | Date |
|---|---|---|
| 525,656 | Great Britain | Sept. 2, 1940 |
| 539,801 | Great Britain | Sept. 24, 1941 |
| 574,266 | Great Britain | Dec. 31, 1945 |

OTHER REFERENCES

Rubber Chemistry and Technology, vol. 11 of 1938—pages 615–616.